United States Patent [19]

Sick et al.

[11] 4,293,776

[45] Oct. 6, 1981

[54] BANKNOTE CONDITION MONITORING APPARATUS

[75] Inventors: Erwin Sick, Icking; Siegfried Mankel, Geretsried, both of Fed. Rep. of Germany

[73] Assignee: Erwin Sick GmbH-Optik-Elektronik, Waldkirch, Fed. Rep. of Germany

[21] Appl. No.: 138,337

[22] Filed: Apr. 8, 1980

[30] Foreign Application Priority Data

May 3, 1979 [DE] Fed. Rep. of Germany ....... 2917875

[51] Int. Cl.³ .............................................. G01N 21/88

[52] U.S. Cl. ..................................... 250/572; 250/236

[58] Field of Search ............... 250/571, 572, 562, 563, 250/234–236; 356/446, 448, 71

[56] References Cited

U.S. PATENT DOCUMENTS 3,360,659 12/1967 Young ............................ 250/571 X

*Primary Examiner*—David C. Nelms

*Assistant Examiner*—Darwin R. Hostetter

[57] ABSTRACT

A banknote condition monitoring apparatus features a mirror wheel (22) located substantially at the focus of a concave mirror strip (25) with an intervening plane mirror (26) to fold the beam path. The mirror wheel (22) scans an incident light beam from a source (28) to form a transmitted light beam in the image space of the concave mirror (25) which is continuously displaced parallel to itself to and fro through the image space. The transmitted light beam is directed via a cylindrical lens (14) onto the surface of a drum (11) carrying the banknotes (12) to be monitored on its peripheral surface by way of air suction via the channels (32). Light remitted from the surface of the banknote is directed through the lower half of the cylindrical lens (14), impinges on a light conducting rod (15) and is detected at an and face of the light conducting rod by a light receiving device (33). The mean output signal from this light receiving device indicates the presence of holed, torn or dog-eared or dirty banknotes but not strips of clear adhesive film which are recognized by the specularly reflected light beam (21) which falls on a stationary photodetector (23). The optical distance of the stationary detector (23) from the drum is equal to that of the mirror wheel scanning device so that the specularly reflected light beam always passes through a stationary point in space.

8 Claims, 3 Drawing Figures

BANKNOTE CONDITION MONITORING APPARATUS

Figure 1:
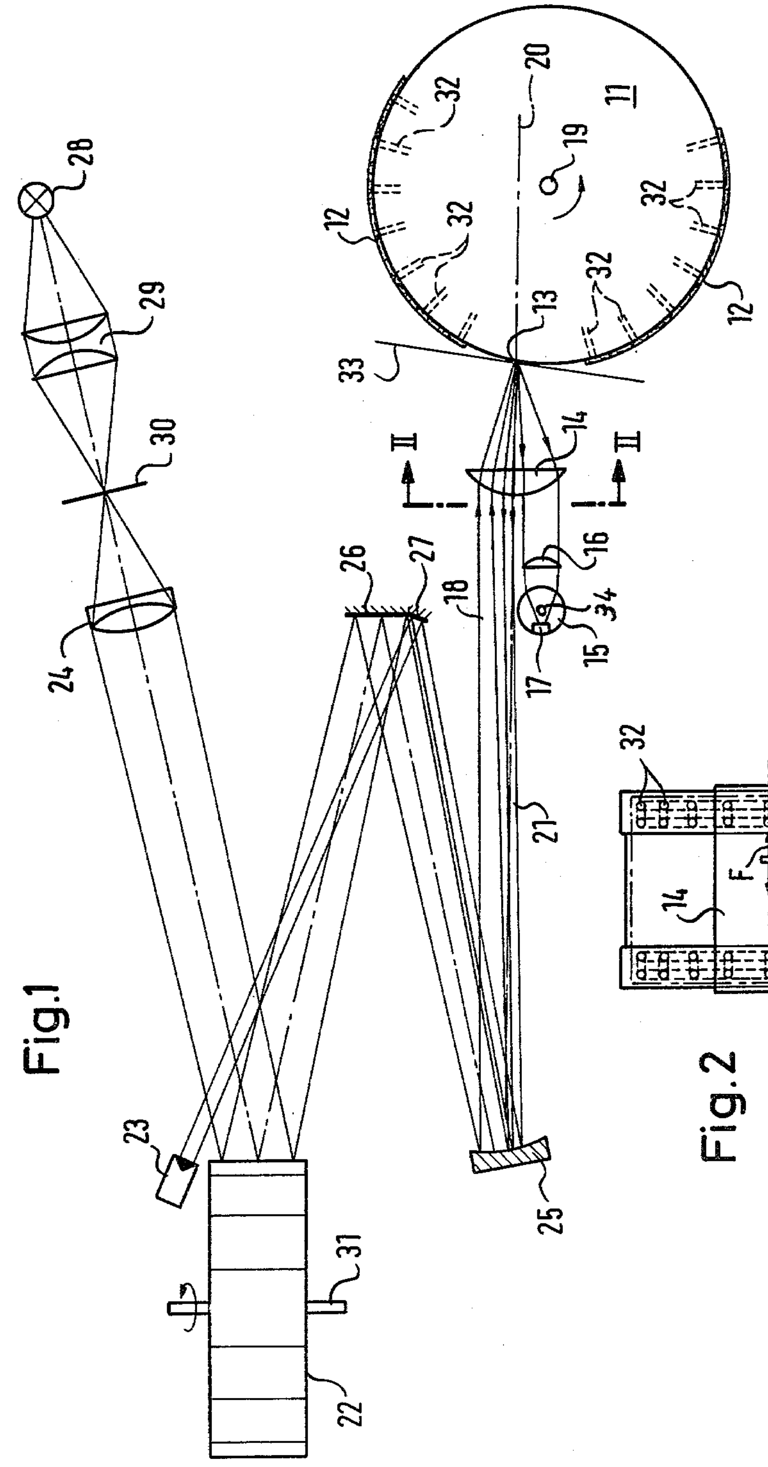

The invention relates to banknote condition monitoring apparatus and has particular reference to apparatus of the kind utilizing a rotating drum on the peripheral surface of which the banknotes to be examined are held, for example by means of air suction. An optical scanning device is used to generate a scanning light beam which forms a scanning light bead on the banknote. The scanning light bead scans the banknote cyclically and transversly to its direction of movement substantially without gaps. A cylindrical lens extending in the scanning direction in front of the banknote concentrates, with a portion of its width, the transmitted light beam onto the banknote and directs light remitted from the banknote with another part of its width onto a light receiving device. The light receiving device conveniently includes a light conducting rod.

Apparatus of this kind is used to sort out banknotes which are dirty, torn, dog-eared or holed. The banknotes are fed to the drum via a transport device. A photodetector is provided at the end of the aforementioned light conducting rod and generates an electrical output signal dependent on the remission capability of the scanned point of the banknote. This signal is passed to an electronic processing circuit which, for example, forms a mean value for the remission over the banknote by integration and compares it with a desired value. If, because of poor condition of the banknote, this mean signal deviates by a predetermined amount from the desired signal the banknote on the drum is automatically rejected. The banknotes which are found to be in order are in contrast transported further and returned to circulation.

Whilst holded, dirty, torn, dog-eared banknotes etc. can be recognized without difficulties and indeed the length and width of a banknote can be determined straightforwardly by the electronic processing circuit the recognition of clear adhesive tape such as "Sellotape or Tesafilm" (registered trademarks) which is frequently used to repair banknotes gives rise to difficulties. A clear adhesive tape produces practically no change in the light remitted from the banknote and thus goes undetected.

The principal object of the present invention is to provide banknote condition monitoring apparatus which also enables the reliable recognition of strips of clear adhesive tape on banknotes without a significant increase in the construction or complexity of the apparatus.

In order to accomplish this object the invention envisages, in apparatus of the initially named kind, that the transmitted light beam is narrow and passes through the cylindrical lens at a portion of its periphery, that the rotational axis of the drum is so displaced relative to the optical axis of the cylindrical lens that specularly reflected light enters the same half of the cylindrical lens as the transmitted light beam, but however separated from the same, and that the specularly reflected beam is deflected in a distance substantially the same as the distance of the scanning device from the point of incidence of the light bead on the banknote directly onto a photodetection device without contacting the scanning member of the optical scanning device.

More general forms of the invention are defined in the accompanying claims 7 and 8.

To the extent that the scanning member is arranged between an objective and a strip-like concave mirror, two plane mirrors, arranged at an angle to one another for deflecting the transmitted light beam and the specularly reflected light, are usefully provided between the scanning member and the concave mirror. The rest of the cylindrical lens is advantageously used to pick up the remitted light. The scanning member is preferably a mirror wheel whilst a matrix of photodiodes electrically connected in parallel is usefully used as the photodetection device.

By virtue of this construction the transmitted light beam falls at an angle to the tangent to the drum carrying the banknote such that light specularly reflected at a clear adhesive strip enters the beam path alongside the transmitted light beam. Thus a geometrical ray separation takes place. It is then only necessary to arrange a photodetection device at an optical distance which corresponds to the distance of the mirror wheel from the point of incidence of the light bead on the banknote. By virtue of the operation of the concave mirror in the scanning beam path the specularly reflected light beam will always pass through the location occupied by the photodetection device-irrespective of the point on the banknote from which it is reflected. By using plane mirrors arranged at an angle to one another the photodetection device for the specularly reflected light can be arranged at a sufficiently significant distance from the mirror wheel.

The constructional complexity and thus the costs and problems in achieving the measures taught by the present invention are extremely low because the optical elements are used twice solely by arranging for a suitable incidence of the light on the surface of the drum carrying the banknotes.

Figure 2:
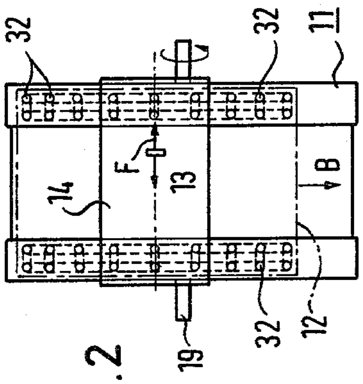
Figure 3:
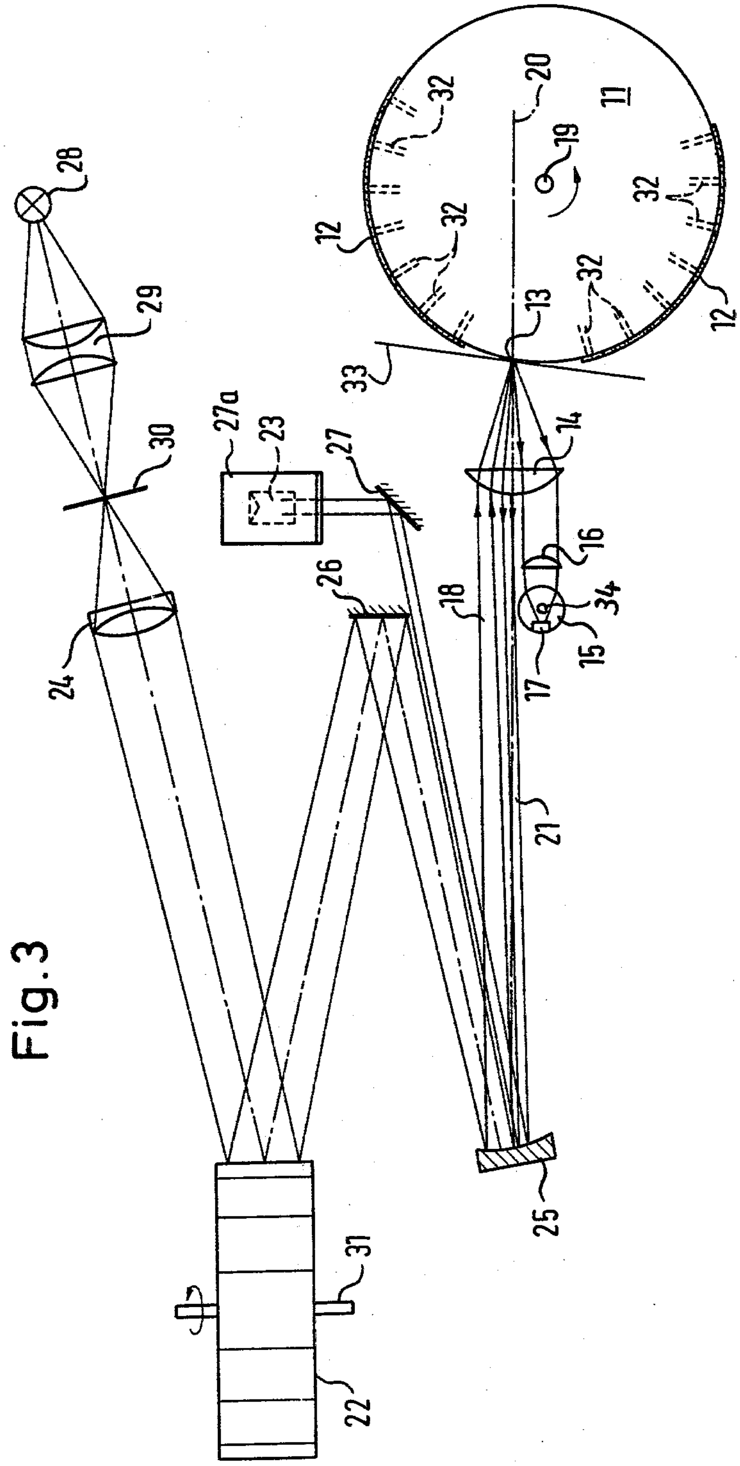

The invention will now be further described by way of example only with reference to specific embodiments as shown in the drawing in which:

FIG. 1 shows a schematic plan view of banknote condition monitoring apparatus in accordance with the present invention but without the electronic processing circuit, FIG. 2 shows a view in the direction of the line II—II in FIG. 1 and FIG. 3 shows a view similar to FIG. 1 of a modified embodiment.

As seen in the drawing a light source 28 is imaged via a condensor system 29 onto the slot of a slot aperture 30. The slot of the slot aperture lies in the same plane as the axis 31 of the subsequent mirror wheel 22. The mirror wheel 22 is arranged at an angle to the incident transmitted beam path so that a surface of the mirror wheel can reflect the light beam to a plane mirror 26 which is located substantially alongside the objective 24 which focusses the rays leaving the slot aperture 30 and directs them to the mirror wheel 22. The transmitted light beam is reflected from the plane mirror 26 to a strip-like concave mirror 25 the longitudinal direction of which is at right angles to the plane of the drawing as seen in FIG. 1. The concave mirror 25 reflects the transmitted light beam 18 to a cylindrical lens 14 which is arranged in the manner shown in FIGS. 1 and 2 in front of a drum 11. Banknotes 12 are held on the peripheral surface of the drum for example by means of air suction via the suction channels 32.

In this manner a scanning light bead 13 is generated by the scanning light beam on the surface of the drum 11 and scans the banknotes 12 in the sense of the double arrow F of FIG. 2 cyclically point by point line by line, in lines which closely follow one another, transverse to its direction of movement B. The scanning light bead has a greater length at right angles to the scanning direction than in the scanning direction.

The rotational axle 19 of the drum is displaced relative to the optical axis 20 of the cylindrical lens 14 by a distance such that the tangent 33 at the point of incidence 13 of the scanning light beam 18 on the banknote has an inclination to the transmitted light beam 18 at which the specularly reflected light 21 enters the same half of the cylindrical lens 14 as the transmitted light beam 18. The transmitted light beam 18 is, however, located in the outermost edge region of the cylindrical lens 14 whilst the received light beam lies further towards the center of the cylindrical lens 14.

By virtue of this construction the specularly reflected light beam 21 is reflected geometrically separated from the transmitted light beam by the concave mirror 25 to a further plane mirror 27 which, in the illustrated manner, is arranged at an angle to the other plane mirror 26. This angle is so chosen that the received specularly reflected light beam is deflected past the mirror wheel 22 to a photoelectric detector 23. The light beam 21 will always impinge on the photodetection device 23 if the latter is positioned at the same optical distance from the point of impingement 13 on the drum, i.e. at the same optical distance from the concave mirror, as the scanning member 22. Thus the specularly reflected beam will always pass through a fixed point and so the photodetection device 23 which can for example consist of 4 photodiodes connected in parallel, can be arranged in a fixed position.

In the embodiment of FIG. 3 a deflecting mirror 27 is arranged alongside and somewhat behind the plane mirror 26 for the transmitted light beam and is followed by a further deflection mirror 27*a* which deflects the specularly deflected light beam 21 into a direction at right angles to the plane of the drawing where it finally impinges on a photodetection device 23 which is once more spaced from the point of incidence 13 by an optical distance corresponding to the optical distance of the surface of the mirror wheel from the point of incidence 13. By virtue of this choice of distance the light beam once more passes through a fixed point in space so that the photodetection device, which preferably consists of 4 photodiodes connected together, can once more be arranged as a stationary detector.

The remitted light enters the lower half of the cylindrical lens 14 and is there deflected via a further cylindrical lens 16 of correspondigly narrow construction to a light conducting rod 15 arranged parallel to the scanning direction. The remitted light is received on the side surface of the light conducting rod and is focussed onto a stepped mirror arrangement 17 which is constructed in the manner described in German Offenlegungsschrift DE-OS No. 25 08 366. A light receiving device in the form of a photodetector 34 is located at one or both of the end faces of the light conducting rod 15.

By virtue of the construction in accordance with the present teaching not only is it possible to determine the effects of the banknotes on the remitted light but also the effects on specularly reflected light which is useful for the recognition of specularly reflecting adhesive strips on the banknotes. This is achieved without significant additional constructional complexity.

It will be appreciated by those skilled in the art that further modifications are possible to the arrangement illustrated in the drawings without departing from the scope of the present teaching. For example it is contemplated that an alternative banknote transport device could be used in place of the drum. Thus, for example, a simple continuously moving belt carrier moving in the direction of the tangent 33 could replace the rotating drum. Furthermore, whilst the light conducting rod 15 is the preferred device for collecting the light remitted from the surface of the banknote it is conceivable that this device could be replaced with an alternative device. In another possible modification the cylindrical lens 14 could be replaced by another optical device or devices in particular an arrangement of refractive elements, if necessary in combination with further lenses, to produce the required beam deflections and focussing.

Lastly it should be mentioned that although the concave mirror strip 25 is preferably spherically concave, other mirror shapes can also be contemplated, for example cylindrically concave and parabolically concave.

We claim:

1. Banknote condition monitoring apparatus comprising a rotating drum on the peripheral surface of which the banknotes to be examined are held, for example by means of air suction, an optical scanning device which generates a scanning light beam which forms a scanning light bead on the banknote which cyclically scans the banknote transversly to its direction of movement substantially without gaps, a cylindrical lens extending in the scanning direction in front of the banknote and which concentrates with a portion of its width the transmitted light beam onto the banknote and directs light remitted from the banknote via another part of its width to a light receiving device and wherein the transmitted light beam is narrow and passes through the cylindrical lens at a portion of its periphery, the rotational axis of the drum is so displaced relative to the optical axis of the cylindrical lens that specularly reflected light enters the same half of the cylindrical lens as the transmitted light beam, but however separated from the same, and the specularly reflected beam is deflected in a distance substantially the same as the distance of the scanning device from the point of incidence of the light bead on the banknote directly onto a photodetection device without contacting the scanning member of the optical scanning device.

2. Banknote condition monitoring apparatus according to claim 1 in which said light receiving device comprises a light conducting rod arranged to receive the remitted light on its side surface.

3. Banknote condition monitoring apparatus in accordance with claim 1 in which the scanning member is arranged between an objective and a strip-like concave mirror and wherein two plane mirrors inclined at an angle to one another are arranged between the scanning member and the concave mirror for deflecting the scanning and the specularly reflected light beams.

4. Banknote condition monitoring apparatus in accordance with claim 1 and wherein the remaining part of the cylindrical lens is used to pick up the remitted light.

5. Banknote condition monitoring apparatus in accordance with claim 1 and wherein the scanning member is a mirror wheel.

6. Banknote condition monitoring apparatus in accordance with claim 1 and wherein the photodetection device consists of a matrix of parallel connected photodiodes.

7. Banknote condition monitoring apparatus comprising a rotating drum, means for holding the banknotes to be examined on the peripheral surface of the drum, an optical scanning device located substantially at the focus of a concave mirror and adapted to produce in the image plane of said concave mirror a scanning light beam for scanning the banknotes point by point, line by line, an elongate generally cylindrical lens extending in front of said drum in the direction of line scanning and adapted to project with a part of its width the scanning light beam at an angle onto the banknotes and to return light remitted from the same with another part of its width onto a first detector, there being further provided a second detector for detecting light specularly reflected from the surface of said banknote and deflected to the second detector via the cylindrical lens and said concave mirror, the second detector being located at substantially the same optical distance from the drum as the optical scanning device but not coincident therewith.

8. Banknote condition monitoring apparatus comprising an optical scanning device located substantially at the focus of a concave mirror and adapted to produce a scanning light beam periodically and continuously displaced parallel to itself in the image space of said concave mirror, means for moving the banknotes through the image space of said concave mirror and at an acute angle to said scanning light beam whereby to scan the banknotes point by point, line by line, a cylindrical lens interposed between said concave mirror and said means with said scanning beam passing through a first part of the cylindrical lens, a first detector arranged to receive light remitted from the surface of said banknotes through a second part of said cylindrical lens, and a second detector for detecting light specularly reflected from the surface of said banknotes through a third part of said cylindrical lens and deflected to the second photodetector via said concave mirror, the second detector being of a relatively small area and being located at substantially the same optical distance from the banknotes as said optical scanning device but not coincident therewith.

* * * * *